US011906320B2

(12) United States Patent
Ji et al.

(10) Patent No.: US 11,906,320 B2
(45) Date of Patent: Feb. 20, 2024

(54) METHOD FOR MANAGING NAVIGATION BROADCAST, AND DEVICE (71) Applicant: BAIDU ONLINE NETWORK TECHNOLOGY (BEIJING) CO., LTD., Beijing (CN)

(72) Inventors: Ran Ji, Beijing (CN); Jizhou Huang, Beijing (CN); Ying Li, Beijing (CN); Yongzhi Ji, Beijing (CN); Lei Jia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 560 days.

(21) Appl. No.: 17/255,004

(22) PCT Filed: Apr. 7, 2020

(86) PCT No.: PCT/CN2020/083550
§ 371 (c)(1),
(2) Date: Dec. 22, 2020

(87) PCT Pub. No.: WO2021/073052
PCT Pub. Date: Apr. 22, 2021

(65) Prior Publication Data
US 2022/0326033 A1 Oct. 13, 2022

(30) Foreign Application Priority Data

Oct. 14, 2019 (CN) .......................... 201910973686.5

(51) Int. Cl.
*G01C 21/36* (2006.01)
(52) U.S. Cl.
CPC ..... *G01C 21/3629* (2013.01); *G01C 21/3608* (2013.01)

(58) Field of Classification Search
USPC ............................. 704/1–504; 715/264, 265
See application file for complete search history.

(56) References Cited

U.S. PATENT DOCUMENTS 9,756,136 B2 * 9/2017 Ben-Tzur ............ H04W 64/003
11,524,242 B2 * 12/2022 Nelson ..................... A63F 13/60
(Continued)

FOREIGN PATENT DOCUMENTS

| CN | 101532849 A | 9/2009 |
| CN | 102324995 A | 1/2012 |
| CN | 102607585 A | 7/2012 |
| CN | 102867005 A | 1/2013 |

(Continued)

OTHER PUBLICATIONS

International Search Report for International Application No. PCT/CN2020/083550, dated May 27, 2020, 12 pages.

(Continued)

*Primary Examiner* — Marcus T Riley
(74) *Attorney, Agent, or Firm* — Lippes Mathias LLP (57) ABSTRACT

The present disclosure provides a method and an apparatus for managing navigation broadcast, and a device, related to an Intelligent transportation technology field. A specific implementation solution includes: obtaining a geographical identifier of a user; obtaining a statement-conversion template set corresponding to the geographical identifier based on the geographical identifier of the user; converting a standard navigation broadcast statement based on the statement-conversion template set to generate a geographical navigation broadcast statement; and performing navigation broadcast based on the geographical navigation broadcast statement. Thereby, the navigation broadcasts are matched with respective regions, users in different regions are provided with diversified and personalized navigation broadcasts.

17 Claims, 3 Drawing Sheets

(56) References Cited

U.S. PATENT DOCUMENTS

| | | | | |
|---|---|---|---|---|
| 11,531,699 | B2* | 12/2022 | Brenner | G11B 27/11 |
| 11,581,969 | B2* | 2/2023 | Modi | G01C 21/3605 |
| 11,588,934 | B1* | 2/2023 | Fontana | G06Q 30/0201 |
| 11,657,441 | B2* | 5/2023 | Harris | G06Q 20/145 |
| | | | | 705/13 |
| 11,662,895 | B2* | 5/2023 | Fettes | G06F 3/04842 |
| | | | | 715/716 |
| 11,694,222 | B1* | 7/2023 | Griggs | H04L 61/00 |
| | | | | 709/224 |
| 2009/0006190 | A1* | 1/2009 | Lucash | G06Q 30/02 |
| | | | | 705/14.71 |
| 2010/0306249 | A1* | 12/2010 | Hill | G06F 16/9535 |
| | | | | 707/769 |
| 2014/0201004 | A1* | 7/2014 | Parundekar | G06Q 30/0271 |
| | | | | 705/14.62 |
| 2014/0222571 | A1* | 8/2014 | Chandra | G06Q 30/0261 |
| | | | | 705/14.58 |
| 2017/0195430 | A1* | 7/2017 | Ben-Tzur | H04W 4/029 |
| 2017/0195990 | A1* | 7/2017 | Ben-Tzur | H04W 4/02 |
| 2022/0326033 | A1* | 10/2022 | Ji | G01C 21/3629 |

FOREIGN PATENT DOCUMENTS

| | | | |
|---|---|---|---|
| CN | 104197946 A | | 12/2014 |
| CN | 107727109 A | | 2/2018 |
| CN | 109462689 A | | 3/2019 |
| CN | 110781657 A | | 2/2020 |
| IN | 103033193 A | | 4/2013 |
| JP | 2004233709 A | | 8/2004 |
| JP | 2004233709 A | * | 8/2004 |
| JP | 2005331608 A | * | 12/2005 |
| JP | 2005331608 A | | 12/2005 |
| JP | 2007-086185 A | | 4/2007 |
| JP | 2018508816 A | | 3/2018 |
| KR | 20070044545 A | | 4/2007 |
| WO | WO-2021073052 A1 | * | 4/2021 ......... G01C 21/3608 |

OTHER PUBLICATIONS

Office Action for Japanese Application No. 2021-500680, dated Feb. 22, 2022, 5 pages.

Search Report for European Application No. 20824882.3, dated Oct. 10, 2023, 8 pages.

* cited by examiner

Fig. 1

Fig. 2 performing word segmentation on the standard navigation broadcast statement to generate a plurality of navigation-content words, and obtaining attribute of the plurality of navigation-content words — 301 filling a part of the plurality of navigation-content words into the statement-conversion template corresponding to the type based on the attribute of the plurality of navigation-content words, to generate the geographical navigation broadcast statement — 302

Fig. 3 performing word segmentation on the standard navigation broadcast statement to generate a plurality of navigation-content words, obtaining a regional language library corresponding to the geographical identifier, converting the plurality of navigation-content words based on the regional language library, and obtaining attribute of the plurality of navigation-content words converted — 401 filling a part of the plurality of navigation-content words into the statement-conversion template corresponding to the type based on the attribute of the plurality of navigation-content words, to generate the geographical navigation broadcast statement — 402

Fig. 4 apparatus for managing navigation broadcast obtaining module 10 determining module 20 converting module 30 broadcast module 40

METHOD FOR MANAGING NAVIGATION BROADCAST, AND DEVICE

CROSS-REFERENCE TO RELATED APPLICATION

This application is a US national phase application of International Application No. PCT/CN2020/083550, filed on Apr. 7, 2020, which claims priority to and benefits of Chinese Patent Application Serial No. 201910973686.5, filed on Oct. 14, 2019, the entire content of which is incorporated herein by reference.

FIELD

The present disclosure relates to a data processing technology field, particularly to an Intelligent transportation technology field, and more particularly to a method and an apparatus for managing navigation broadcast, and a device.

BACKGROUND

With the popularization of automobiles, driving by car has become one of the common ways for people to travel, and the navigation broadcast function has also emerged. The navigation broadcast function can broadcast navigation-related information for users, such as voice broadcast of current road conditions, prompt of turning ahead, etc.

In related technologies, during navigation broadcast, the broadcast is performed through the preset standard navigation broadcast statement.

SUMMARY

Embodiments of the present disclosure provide a method for managing navigation broadcast, including: obtaining a geographical identifier of a user; obtaining a statement-conversion template set corresponding to the geographical identifier based on the geographical identifier of the user; converting a standard navigation broadcast statement based on the statement-conversion template set to generate a geographical navigation broadcast statement; and performing navigation broadcast based on the geographical navigation broadcast statement.

Embodiments of the present disclosure provide an electronic device, including communicatively connected to the at least one processor. The storage device has instructions executable by the at least one processor stored thereon. The instructions are executed by the at least one processor to cause the at least one processor to implement the method for managing navigation broadcast according to embodiments of the present disclosure.

Embodiments of the present disclosure provide a non-transitory computer-readable storage medium having computer instructions stored thereon. The computer instructions are configured to cause a computer to implement the method for managing navigation broadcast according to embodiments of the present disclosure.

Other effects of the above alternatives will be described in the following descriptions in combination with specific embodiments.

BRIEF DESCRIPTION OF THE DRAWINGS

The accompany drawings are used for a better understanding of the present disclosure, and do not constitute a limitation to the present disclosure, in which.

DETAILED DESCRIPTION

Reference will be made to exemplary embodiments of the present disclosure in the following in combination with the accompanying drawings, including various details of the embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for the sake of clarity and conciseness, the following description omits the description of well-known functions and structures.

Figure 1:
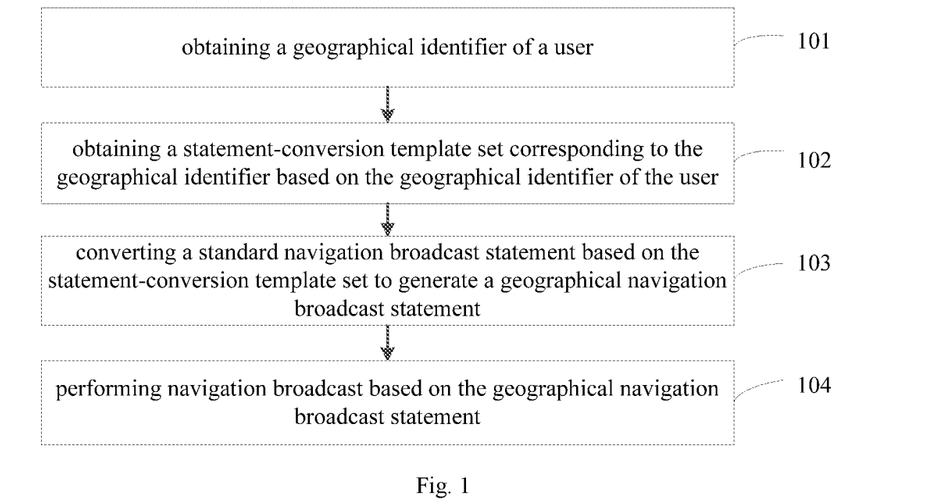
FIG. 1 is a flow chart of a method for managing navigation broadcast according to an embodiment of the present disclosure.

FIG. 1 is a flow chart of a method for managing navigation broadcast according to an embodiment of the present disclosure. As illustrated in FIG. 1, the method includes follows.

At block 101, a geographical identifier of a user is obtained.

In an embodiment, when the navigation broadcast is performed, the geographical identifier of the user may be obtained first, so that the navigation broadcast is performed based on the geographical identifier of the user. For example, different geographical identifiers may be divided according to provinces, cities, dialect categories, etc., which is not specifically limited herein.

There may be several ways to obtain the geographical identifier, as described below.

As a possible implementation, the geographical identifier may be obtained based on position information of the user. For example, the position information of the user is obtained by a global positioning system, and a geographical identifier corresponding to the position information is determined by querying a preset database based on the position of the user.

As another possible implementation, the geographical identifier may be obtained based on an instruction input by the user. For example, the user inputs the instruction to select the geographical identifier, and then a terminal device determines a corresponding geographical identifier based on the instruction input by the user, thus the geographical identifier of the user is obtained. The forms for the user to input the instruction include but are not limited to a voice input, a key input on a touch screen, a touch track input, etc.

As another possible implementation, the instruction input by the user may be firstly obtained, and the geographical identifier is obtained based on the instruction input by the user. When it is detected that the user does not input a related instruction within a preset time period, the position information of the user is further obtained, and the geographical identifier is obtained based on the position information.

At block 102, a statement-conversion template set corresponding to the geographical identifier is obtained based on the geographical identifier of the user.

In an embodiment, the statement-conversion template set corresponding to the geographical identifier may be pre-stored. After the geographical identifier of the user is obtained, the statement-conversion template set corresponding to the geographical identifier of the user may be obtained by querying. For example, a geographical identifier of the user is obtained to be Beijing, a statement-conversion template set corresponding to Beijing is obtained based on the geographical identifier.

Alternatively, the statement-conversion template set may include multiple types of statement-conversion templates, such as a statement-conversion template for navigating and broadcasting a driving direction, and a statement-conversion template for navigating and broadcasting a turning. The statement-conversion template set is configured to convert a navigation broadcast statement. The statement-conversion template set may be set according to dialects, place names, statement styles, forms and habits of language expression in respective regions.

At block 103, a standard navigation broadcast statement is converted based on the statement-conversion template set to generate a geographical navigation broadcast statement.

In an embodiment, a standard navigation broadcast statement to be broadcasted currently may be obtained, and the standard navigation broadcast statement is converted based on a statement-conversion template in the statement-conversion template set to generate the geographical navigation broadcast statement after the statement-conversion template set is determined. The standard navigation broadcast statement may be a preset default broadcast statement, such as statements used for broadcasting a driving direction and a current road congestion condition.

For example, the standard navigation broadcast statement is "Road xx, congested from east to west". The standard navigation broadcast statement is converted based on the statement-conversion template set, and a geographical navigation broadcast statement a "xx road, where the east gate of the zoo is, is congested from east to west" is generated. It may be understood that, the statement-conversion template set varies with the acquired geographical identifier of the user, and the finally generated geographical navigation broadcast statement also varies. For example, the generated geographical navigation broadcast statement may also be "Road xx, congested in a direction to yy region".

At block 104, navigation broadcast is performed based on the geographical navigation broadcast statement.

In an embodiment, a corresponding navigation broadcast voice may be generated based on a text of the geographical navigation broadcast statement after the geographical navigation broadcast statement is obtained, and then the navigation broadcast is performed based on the navigation broadcast voice.

It may be understood that, users in different regions may have differences in dialects, place names, statement styles, forms and habits of language expressions. For example, for a place A, an expression of a direction is from south to north, while, an expression of a direction at a place B is out of city and into city. In the related art, the navigation broadcast is carried out by a preset standard navigation broadcast statements, and the ways for navigation broadcast is relatively simple.

With the method for managing navigation broadcast according to embodiments of the present disclosure, by obtaining the geographical identifier of the user, the statement-conversion template set corresponding to the geographical identifier is obtained based on the geographical identifier of the user. Further, the standard navigation broadcast statement is converted based on the statement-conversion template set to generate the geographical navigation broadcast statement, and navigation broadcast is performed based on the geographical navigation broadcast statement. Thereby, the navigation broadcast is matched with a dialect, a place name, a statement style of respective region, users in different regions may be provided with diversified and personalized navigation broadcasts, extending functions of a navigation product.

On the basis of above embodiments, descriptions will be made to converting the standard navigation broadcast statement to generate the geographical navigation broadcast statement in the following.

Figure 2:
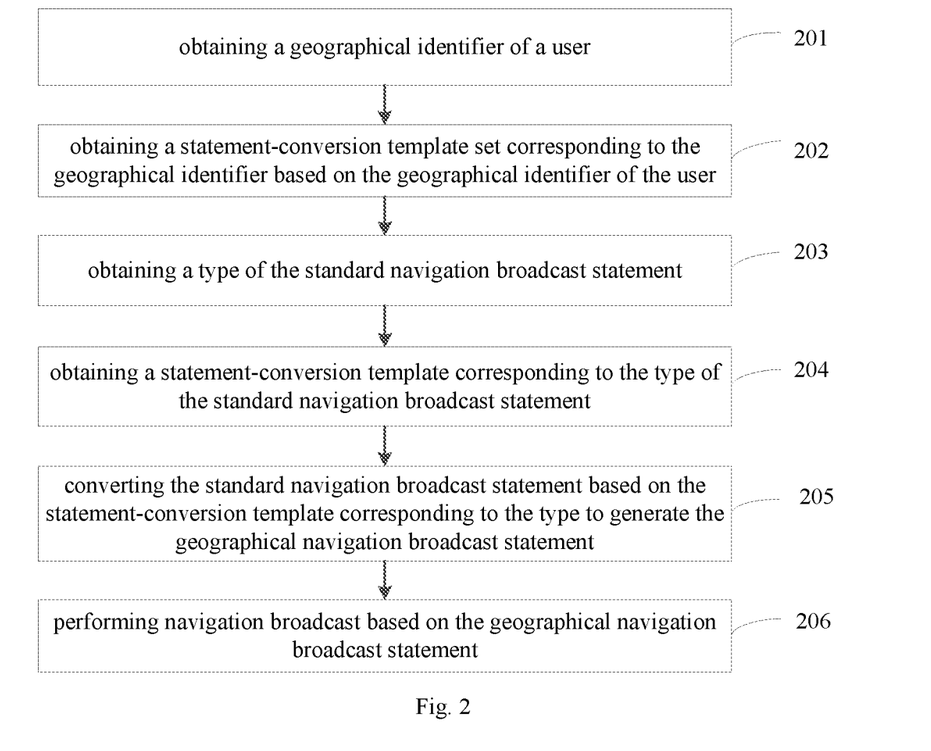
FIG. 2 is a flow chart of a method for managing navigation broadcast according to another embodiment of the present disclosure.

FIG. 2 is a flow chart of a method for managing navigation broadcast according to another embodiment of the present disclosure. As illustrated in FIG. 2, the method includes followings.

At block 201, a geographical identifier of a user is obtained.

At block 202, a statement-conversion template set corresponding to the geographical identifier is obtained based on the geographical identifier of the user.

The foregoing explanations of actions at blocks 101 and 102 may also apply to actions at blocks 201 and 202 of this embodiment, and will not be repeated herein.

At block 203, a type of the standard navigation broadcast statement is obtained.

In an embodiment, the standard navigation broadcast statement may be preset, and the type of each standard navigation broadcast statement may be set. For example, the type of the standard navigation broadcast statement may include a driving direction type, a road condition type, and the like. Thus, a type of a standard navigation broadcast statement to be currently broadcasted may be obtained when the standard navigation broadcast statement to be currently broadcasted is obtained. The standard navigation broadcast statement may be a preset default broadcast statement.

At block 204, a statement-conversion template corresponding to the type of the standard navigation broadcast statement is obtained.

In an embodiment, different types of standard navigation broadcast statements may correspond to different statement-conversion templates. For example, a standard navigation broadcast statement of a driving direction type corresponds to a statement-conversion template for navigating and broadcasting the driving direction. By obtaining the type of the standard navigation broadcast statement, the corresponding statement-conversion template may be obtained according to the type.

At block 205, the standard navigation broadcast statement is converted based on the statement-conversion template corresponding to the type to generate the geographical navigation broadcast statement.

In an embodiment, after the statement-conversion template corresponding to the standard navigation broadcast statement is determined, the standard navigation broadcast statement is converted based on the statement-conversion template to generate the geographical navigation broadcast statement. Thus, the navigation broadcast statement is modified to match the dialect, the place name and statement style.

Figure 3:
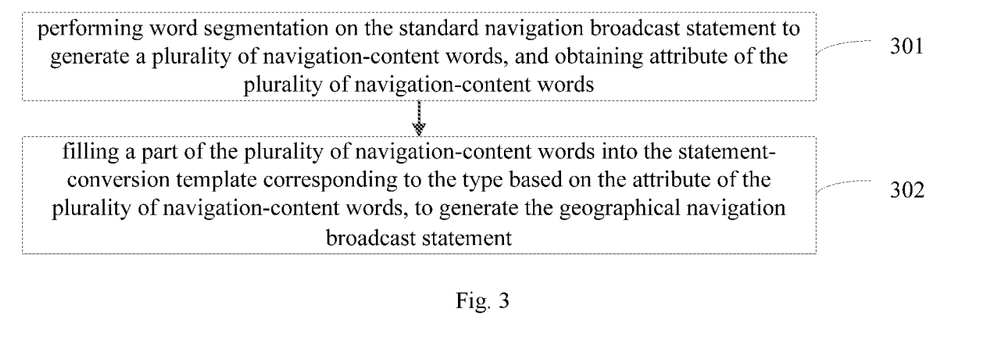
FIG. 3 is a flow chart of a method for managing navigation broadcast according to another embodiment of the present disclosure.

In an embodiment of the present disclosure, as illustrated in FIG. 3, the action at block 205 may include followings.

At block 301, word segmentation is performed on the standard navigation broadcast statement to generate a plurality of navigation-content words, and attribute of the plurality of navigation-content words is obtained.

In an embodiment, the word segmentation may be performed on the standard navigation broadcast statement through a natural language processing technology to generate the plurality of navigation-content words, and the attribute of the plurality of navigation-content words is obtained.

For example, the word segmentation is performed on the standard navigation broadcast statement through a related word segmentation method to generate the plurality of navigation-content words, and the attribute of the plurality of navigation-content words is obtained by querying a preset dictionary. For example, the attribute includes the part of speech, thus, a plurality of navigation-content words with parts of speech such as a noun, a verb, an adjective are obtained. For another example, the attribute includes types such as a place name, a direction, thus, a plurality of navigation-content words of types such as place names, directions are obtained. The word segmentation method may include a word segmentation method based on character string matching, a word segmentation method based on understanding, and a word segmentation method based on statistics. It should be noted that, above implementation ways for performing the word segmentation on the standard navigation broadcast statement and obtaining the attribute are merely examples, but are not limited herein.

At block 302, a part of the plurality of navigation-content words are filled into the statement-conversion template corresponding to the type based on the attribute of the plurality of navigation-content words, to generate the geographical navigation broadcast statement.

In an embodiment, the statement-conversion template includes at least one vacancy to be filled with a navigation-content word and attribute information corresponding to the vacancy. The attribute of the plurality of navigation-content words is compared with attribute of the vacancy, and a navigation-content word corresponding to the vacancy is determined from the plurality of navigation-content words. The geographical navigation broadcast statement is generated by filling the navigation-content word into the vacancy.

For example, the statement-conversion template includes a vacancy 1 with attribute of noun, a vacancy 2 with attribute of verb, and a preset phase. Attribute of three obtained navigation-content words A, B and C are noun, verb, and adjective respectively. Thus, the navigation-content word A is filled into the vacancy 1, and the navigation-content word B is filled into the vacancy 2, to generate the geographical navigation broadcast statement.

It should be noted that, a part of the plurality of navigation-content words may be filled into the corresponding statement-conversion template. All the plurality of navigation-content words may be filled into the corresponding statement-conversion template according practical situation.

Figure 4:
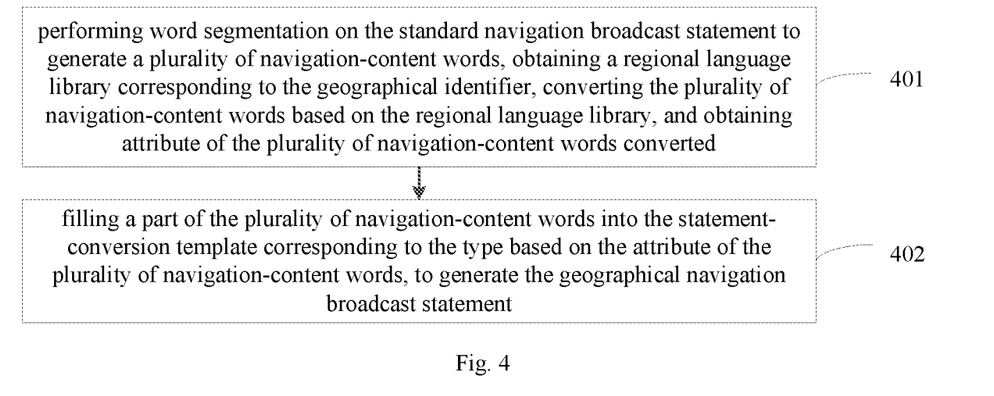
FIG. 4 is a flow chart of a method for managing navigation broadcast according to another embodiment of the present disclosure.

In another embodiment of the present disclosure, as illustrated in FIG. 4, the action at block 205 includes followings.

At block 401, word segmentation is performed on the standard navigation broadcast statement to generate a plurality of navigation-content words, a regional language library corresponding to the geographical identifier is obtained, the plurality of navigation-content words are converted based on the regional language library, and attribute of the plurality of navigation-content words converted is obtained.

In an embodiment, the word segmentation may be performed on the standard navigation broadcast statement through a natural language processing technology to generate the plurality of navigation-content words. And then, the regional language library corresponding to the geographical identifier is obtained, and the plurality of navigation-content words are converted based on the regional language library. Further, the attribute of the plurality of navigation-content words converted is obtained.

The regional language library may be preset according to different regions. The regional language library is configured to convert the navigation-content words in the standard navigation broadcast statement into words that conform to a place name of a region, a form and a habit of language expression. For example, a statement "xx road" is converted into a place name related to a region, such as "xx road where the east gate of the zoo is", or "Binjiang Road a Bridge at xx road". For example, a statement "from east to west" is converted into an expression related to a regional habit, such as "east to west", or "go to yy region".

At block 402, a part of the plurality of navigation-content words converted are filled into a corresponding statement-conversion template based on the attribute of the plurality of navigation-content words converted, to generate the geographical navigation broadcast statement.

In an embodiment, the statement-conversion template includes a vacancy to be filled with a navigation-content word and attribute information corresponding to the vacancy. The attribute of the plurality of navigation-content words converted is compared with attribute of the vacancy, and a navigation-content word corresponding to the vacancy is determined from the plurality of navigation-content words converted. The geographical navigation broadcast statement is generated by filling the navigation-content word into the vacancy.

For example, the standard navigation broadcast statement is "Road xx, congested from east to west". By converting the navigation-content words obtained by word segmentation based on the regional language library and filling into the corresponding statement-conversion template, a geographical navigation broadcast statement "Binjiang Road a Bridge at xx road, congested in a direction to yy region" is generated.

At block 206, navigation broadcast is performed based on the geographical navigation broadcast statement.

In an embodiment of the present disclosure, a geographical voice packet corresponding to the geographical identifier may be obtained, and a navigation broadcast voice is generated based on the geographical navigation broadcast statement and the geographical voice packet. The geographical voice packet is configured to generate a navigation broadcast voice related to a region, such as a modified dialect voice. Thereby, the geographical navigation broadcast statement may be broadcasted in navigation based on the dialect voice, providing a voice packet and a related broadcast statement carrying a regional dialect, further improving matching degree between the navigation broadcast and the region.

With the method for managing navigation broadcast according to embodiments of the present disclosure, by obtaining the type of the standard navigation broadcast statement, the statement-conversion template corresponding to the type of the standard navigation broadcast statement is obtained. And then, word segmentation is performed on the standard navigation broadcast statement to generate the plurality of navigation-content words, the attribute of the plurality of navigation-content words is obtained, and a part of the plurality of navigation-content words is filled into the corresponding statement-conversion template based on the attribute of the plurality of navigation-content words, to generate the geographical navigation broadcast statement. Thereby, the navigation broadcast matches with the dialect, the place name, the statement style of the region, users in different regions may be provided with diversified and personalized navigation broadcasts, extending functions of a navigation product. In addition, the regional language library corresponding to the geographical identifier is obtained, and the plurality of navigation-content words is converted based on the regional language library, further improving matching degree between the navigation broadcast and the region.

To implement the above embodiments, the present disclosure further provides an apparatus for managing navigation broadcast.

Figure 5:
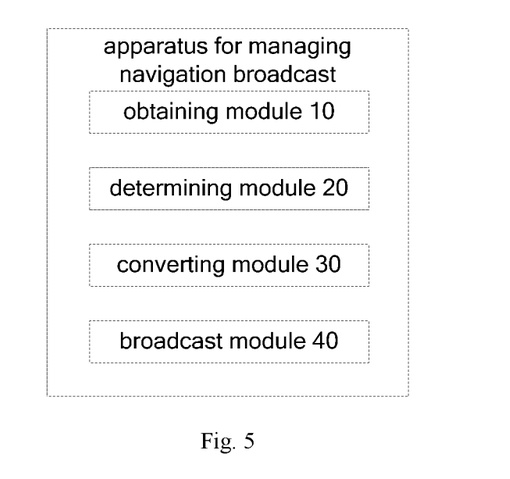
FIG. 5 is a block diagram illustrating an apparatus for managing navigation broadcast according to an embodiment of the present disclosure.

FIG. 5 is a block diagram illustrating an apparatus for managing navigation broadcast according to an embodiment of the present disclosure. As illustrated in FIG. 5, the apparatus includes an obtaining module 10, a determining module 20, a converting module 30, and a broadcast module 40.

The obtaining module 10 is configured to obtain a geographical identifier of a user.

The determining module 20 is configured to obtain a statement-conversion template set corresponding to the geographical identifier based on the geographical identifier of the user.

The converting module 30 is configured to convert a standard navigation broadcast statement based on the statement-conversion template set to generate a geographical navigation broadcast statement.

The broadcast module 40 is configured to perform navigation broadcast based on the geographical navigation broadcast statement.

In an embodiment, the broadcast module 40 is configured to: obtain a geographical voice packet corresponding to the geographical identifier; and generate a navigation broadcast voice based on the geographical navigation broadcast statement and the geographical voice packet.

In an embodiment, obtaining module 10 is configured to: obtain the geographical identifier based on position information of the user; or obtain the geographical identifier based on an instruction input by the user.

Figure 6:
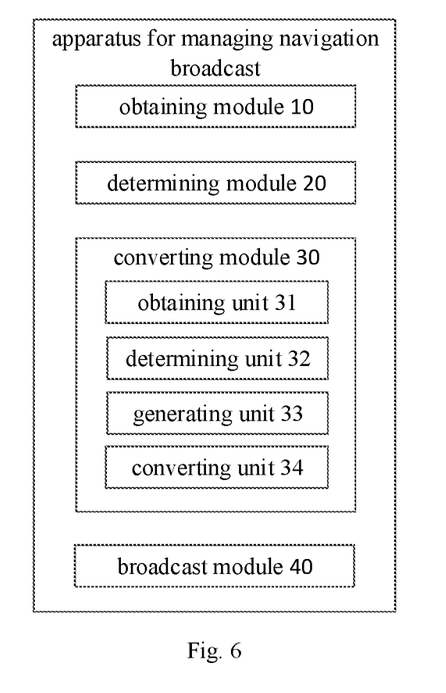
FIG. 6 is a block diagram illustrating an apparatus for managing navigation broadcast according to another embodiment of the present disclosure.

On the basis of the FIG. 5, in an apparatus illustrated in FIG. 6, the converting module 30 includes an obtaining unit 31, a determining unit 32, a generating unit 33, and a converting unit 34.

The statement-conversion template set comprises a plurality of types of statement-conversion templates.

The obtaining unit 31 is configured to obtain a type of the standard navigation broadcast statement.

The determining unit 32 is configured to obtain a statement-conversion template corresponding to the type of the standard navigation broadcast statement.

The generating unit 33 is configured to convert the standard navigation broadcast statement based on the statement-conversion template corresponding to the type to generate the geographical navigation broadcast statement.

In an embodiment, the generating unit 33 is configured to: perform word segmentation on the standard navigation broadcast statement to generate a plurality of navigation-content words, and obtain attribute of the plurality of navigation-content words; and fill a part of the plurality of navigation-content words into the statement-conversion template corresponding to the type based on the attribute of the plurality of navigation-content words, to generate the geographical navigation broadcast statement.

The converting unit 34 is configured to obtain a regional language library corresponding to the geographical identifier; and convert the plurality of navigation-content words based on the regional language library.

It should be noted that, the descriptions of the method for managing navigation broadcast in the foregoing embodiments also suitable to the apparatus for managing navigation broadcast in this embodiment, which are not elaborated herein.

With the apparatus for managing navigation broadcast according to embodiments of the present disclosure, by obtaining the geographical identifier of the user, the statement-conversion template set corresponding to the geographical identifier is obtained based on the geographical identifier of the user. Further, the standard navigation broadcast statement is converted based on the statement-conversion template set to generate the geographical navigation broadcast statement, and navigation broadcast is performed based on the geographical navigation broadcast statement. Thereby, the navigation broadcast is matched with a dialect, a place name, a statement style of respective region, users in different regions may be provided with diversified and personalized navigation broadcasts, extending functions of a navigation product.

To implement the above embodiments, the present disclosure further provides a computer program product. When instructions in the computer program product are executed by a processor, the method for managing navigation broadcast according to any of the foregoing embodiments of the present disclosure is implemented.

According to embodiments of the present disclosure, the present disclosure further provides an electronic device and a non-transitory computer-readable storage medium.

Figure 7:
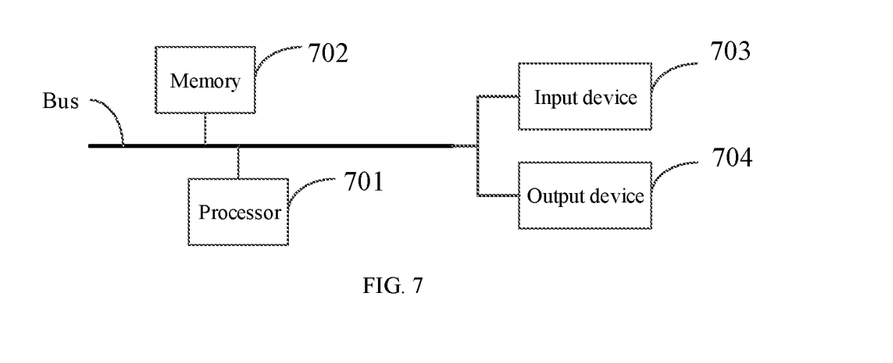
FIG. 7 is a schematic diagram illustrating an electronic device according to an embodiment of the present disclosure.

FIG. 7 is a schematic diagram illustrating an electronic device for implementing a method for managing navigation broadcast according to an embodiment of the present disclosure. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile devices, such as a personal digital processing, a cellular phone, a smart phone, a wearable device, and other similar computing devices. The components shown here, their connections and relations, and their functions are merely examples, and are not intended to limit the implementation of the present disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used together with a plurality of memories and processors, if desired. Similarly, a plurality of electronic devices can be connected, for example, as a server array, a group of blade servers, or a multiprocessor system, each providing some of the necessary operations. A processor 701 is taken as an example in FIG. 7.

The memory 702 is a non-transitory computer-readable storage medium provided by the present disclosure. The memory stores instructions executable by at least one processor, so that the at least one processor executes the method for managing navigation broadcast provided by the present disclosure. The non-transitory computer-readable storage medium of the present disclosure stores computer instructions, which are used to cause a computer to execute the method for managing navigation broadcast provided by the present disclosure.

As a non-transitory computer-readable storage medium, the memory 502 is configured to store non-transitory software programs, non-transitory computer executable programs and modules, such as program instructions/modules (for example, the obtaining module 10, the determining module 20, the converting module 30, and the broadcast module 40 illustrated in FIG. 5) corresponding to the method for managing navigation broadcast in the embodiments of the present disclosure. The processor 701 executes various functional applications and data processing of the server by running non-transitory software programs, instructions, and modules stored in the memory 702, that is, implementing the method for managing navigation broadcast in the foregoing method embodiments.

The memory 702 may include a storage program area and a storage data area, where the storage program area may store an operating system and application programs required for at least one function. The storage data area may store data created according to the use of the electronic device. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device through a network. Examples of the above network include, but are not limited to, the Internet, an intranet, a local area network, a mobile communication network, and combinations thereof.

The electronic device for the method for managing navigation broadcast may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of the electronic device, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that may receive data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, middleware components, front-end components, or any combination thereof front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical solution according to embodiments of the present disclosure, accuracy of a position of an obtained candidate frame is improved, solving a problem that the accuracy of obtaining a candidate frame in managing navigation broadcast in dense scene needs to be improved, so that the management accuracy of navigation broadcast is improved.

It should be understood that the various forms of processes shown above can be used to reorder, add or delete steps. For example, the steps described in the present disclosure may be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for managing navigation broadcast, comprising:
    obtaining a geographical identifier of a user;
    obtaining a statement-conversion template set corresponding to the geographical identifier based on the geographical identifier of the user, wherein the statement-conversion template set comprises a plurality of types of statement-conversion templates;
    converting a standard navigation broadcast statement based on the statement-conversion template set to generate a geographical navigation broadcast statement; and
    performing navigation broadcast based on the geographical navigation broadcast statement;
    wherein converting the standard navigation broadcast statement based on the statement-conversion template set to generate the geographical navigation broadcast statement comprises:
    obtaining a type of the standard navigation broadcast statement;
    obtaining a statement-conversion template corresponding to the type of the standard navigation broadcast statement; and
    converting the standard navigation broadcast statement based on the statement-conversion template corresponding to the type to generate the geographical navigation broadcast statement.

2. The method according to claim 1, wherein converting the standard navigation broadcast statement based on the statement-conversion template corresponding to the type to generate the geographical navigation broadcast statement comprises:
    performing word segmentation on the standard navigation broadcast statement to generate a plurality of navigation-content words, and obtaining attribute of the plurality of navigation-content words; and
    filling a part of the plurality of navigation-content words into the statement-conversion template corresponding to the type based on the attribute of the plurality of navigation-content words, to generate the geographical navigation broadcast statement.

3. The method according to claim 2, after performing word segmentation on the standard navigation broadcast statement to generate the plurality of navigation-content words, further comprising:
    obtaining a regional language library corresponding to the geographical identifier; and
    converting the plurality of navigation-content words based on the regional language library.

4. The method according to claim 1, wherein performing navigation broadcast based on the geographical navigation broadcast statement comprising:
    obtaining a geographical voice packet corresponding to the geographical identifier; and
    generating a navigation broadcast voice based on the geographical navigation broadcast statement and the geographical voice packet.

5. The method according to claim 1, wherein obtaining the geographical identifier of the user comprising:
    obtaining the geographical identifier based on position information of the user; or
    obtaining the geographical identifier based on an instruction input by the user.

6. An electronic device, comprising:
    at least one processor; and
    a storage device communicatively connected to the at least one processor;
    wherein, the storage device has instructions executable by the at least one processor stored thereon, when the instructions are executed by the at least one processor, the at least one processor is caused to implement a method for managing navigation broadcast, the method comprising:
    obtaining a geographical identifier of a user;
    obtaining a statement-conversion template set corresponding to the geographical identifier based on the geographical identifier of the user, wherein the statement-conversion template set comprises a plurality of types of statement-conversion templates;
    converting a standard navigation broadcast statement based on the statement-conversion template set to generate a geographical navigation broadcast statement; and
    performing navigation broadcast based on the geographical navigation broadcast statement;
    wherein converting the standard navigation broadcast statement based on the statement-conversion template set to generate the geographical navigation broadcast statement comprises:
    obtaining a type of the standard navigation broadcast statement;
    obtaining a statement-conversion template corresponding to the type of the standard navigation broadcast statement; and
    converting the standard navigation broadcast statement based on the statement-conversion template corresponding to the type to generate the geographical navigation broadcast statement.

7. A non-transitory computer-readable storage medium having computer instructions stored thereon, wherein, the computer instructions are configured to cause a computer to implement a method for managing navigation broadcast, the method comprising:
    obtaining a geographical identifier of a user;
    obtaining a statement-conversion template set corresponding to the geographical identifier based on the geographical identifier of the user, wherein the statement-conversion template set comprises a plurality of types of statement-conversion templates;
    converting a standard navigation broadcast statement based on the statement-conversion template set to generate a geographical navigation broadcast statement;
    and performing navigation broadcast based on the geographical navigation broadcast statement;

wherein converting the standard navigation broadcast statement based on the statement-conversion template set to generate the geographical navigation broadcast statement comprises:
- obtaining a type of the standard navigation broadcast statement;
- obtaining a statement-conversion template corresponding to the type of the standard navigation broadcast statement; and
- converting the standard navigation broadcast statement based on the statement-conversion template corresponding to the type to generate the geographical navigation broadcast statement.

8. The method according to claim 1, wherein performing navigation broadcast based on the geographical navigation broadcast statement comprising:
- obtaining a geographical voice packet corresponding to the geographical identifier; and
- generating a navigation broadcast voice based on the geographical navigation broadcast statement and the geographical voice packet.

9. The method according to claim 2, wherein performing navigation broadcast based on the geographical navigation broadcast statement comprising:
- obtaining a geographical voice packet corresponding to the geographical identifier; and
- generating a navigation broadcast voice based on the geographical navigation broadcast statement and the geographical voice packet.

10. The electronic device according to claim 6, wherein converting the standard navigation broadcast statement based on the statement-conversion template corresponding to the type to generate the geographical navigation broadcast statement comprises:
- performing word segmentation on the standard navigation broadcast statement to generate a plurality of navigation-content words, and obtaining attribute of the plurality of navigation-content words; and
- filling a part of the plurality of navigation-content words into the statement-conversion template corresponding to the type based on the attribute of the plurality of navigation-content words, to generate the geographical navigation broadcast statement.

11. The electronic device according to claim 10, wherein, after performing word segmentation on the standard navigation broadcast statement to generate the plurality of navigation-content words, the method further comprises:
- obtaining a regional language library corresponding to the geographical identifier; and
- converting the plurality of navigation-content words based on the regional language library.

12. The electronic device according to claim 6, wherein performing navigation broadcast based on the geographical navigation broadcast statement comprising:
- obtaining a geographical voice packet corresponding to the geographical identifier; and
- generating a navigation broadcast voice based on the geographical navigation broadcast statement and the geographical voice packet.

13. The electronic device according to claim 6, wherein obtaining the geographical identifier of the user comprising:
- obtaining the geographical identifier based on position information of the user; or
- obtaining the geographical identifier based on an instruction input by the user.

14. The storage medium according to claim 7, wherein converting the standard navigation broadcast statement based on the statement-conversion template corresponding to the type to generate the geographical navigation broadcast statement comprises:
- performing word segmentation on the standard navigation broadcast statement to generate a plurality of navigation-content words, and obtaining attribute of the plurality of navigation-content words; and
- filling a part of the plurality of navigation-content words into the statement-conversion template corresponding to the type based on the attribute of the plurality of navigation-content words, to generate the geographical navigation broadcast statement.

15. The storage medium according to claim 14, wherein, after performing word segmentation on the standard navigation broadcast statement to generate the plurality of navigation-content words, the method further comprises:
- obtaining a regional language library corresponding to the geographical identifier; and
- converting the plurality of navigation-content words based on the regional language library.

16. The storage medium according to claim 7, wherein performing navigation broadcast based on the geographical navigation broadcast statement comprising:
- obtaining a geographical voice packet corresponding to the geographical identifier; and
- generating a navigation broadcast voice based on the geographical navigation broadcast statement and the geographical voice packet.

17. The storage medium according to claim 7, wherein obtaining the geographical identifier of the user comprising:
- obtaining the geographical identifier based on position information of the user; or
- obtaining the geographical identifier based on an instruction input by the user.

* * * * *